United States Patent [19]

Jacobs et al.

[11] 3,904,494

[45] Sept. 9, 1975

[54] EFFLUENT GAS RECYCLING AND RECOVERY IN ELECTROLYTIC CELLS FOR PRODUCTION OF ALUMINUM FROM ALUMINUM CHLORIDE

[75] Inventors: Stanley C. Jacobs; Ronald C. Schoener, both of Lower Burrell, Pa.

[73] Assignee: Aluminum Company of America, Pittsburgh, Pa.

[22] Filed: Nov. 27, 1973

[21] Appl. No.: 419,390

Related U.S. Application Data

[63] Continuation-in-part of Ser. No. 178,864, Sept. 9, 1971, abandoned.

[52] U.S. Cl. .................. 204/67; 55/71; 55/72; 55/82;
[51] Int. Cl. .................. C22d 3/12; B01d 53/00; B01d 59/08
[58] Field of Search .............. 55/71, 72, 82; 204/67

[56] References Cited
UNITED STATES PATENTS

| | | | |
|---|---|---|---|
| 1,478,750 | 12/1923 | McElroy | 55/82 X |
| 1,519,648 | 12/1924 | Williams | 204/67 |
| 3,435,592 | 4/1969 | Lindenmaier et al. | 55/71 |
| 3,582,262 | 6/1971 | Tomany | 55/72 X |

FOREIGN PATENTS OR APPLICATIONS 16,794  10/1890  United Kingdom................. 204/67

*Primary Examiner*—John H. Mack
*Assistant Examiner*—D. R. Valentine
*Attorney, Agent, or Firm*—Abram W. Hatcher, Esq.; John P. Taylor, Esq.

[57] ABSTRACT

Recycle system for the recovery and reuse of the effluent gas and additional values emitted in production of aluminum by electrolysis of aluminum chloride.

11 Claims, 1 Drawing Figure

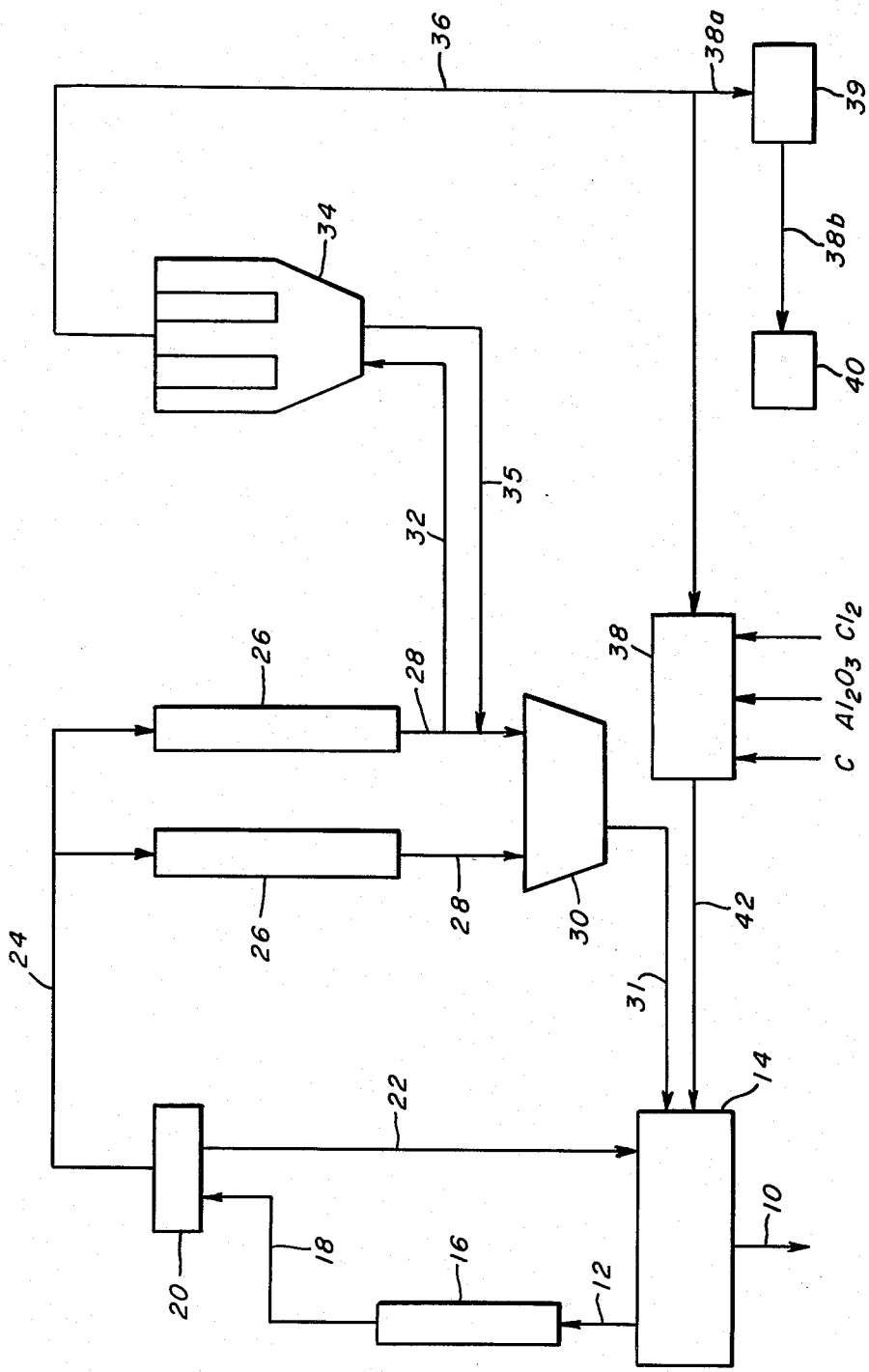

EFFLUENT GAS RECYCLING AND RECOVERY IN ELECTROLYTIC CELLS FOR PRODUCTION OF ALUMINUM FROM ALUMINUM CHLORIDE

This application is a continuation-in-part of U.S. Ser. No. 178,864, filed Sept. 9, 1971 now abandoned.

This invention relates to electrolytic production of aluminum from aluminum chloride, and particularly, to a method for the recovery and reuse of values contained in effluent gas generated during the production thereof.

While the production of aluminum by electrolysis of aluminum chloride in a halide melt or electrolyte has been a long-desired and theoretically feasible objective of the art, the economic attainment thereof has never become a commercial reality. Among the many reasons therefor are numerous unsolved problems occasioned, for example, by the highly corrosive nature of an alkali and/or alkaline earth metal halide electrolyte or melt, the necessity of maintaining the purity and concentration of aluminum chloride in the cell employed within critical values, and the like, all of which pose both technical and economic barriers to the necessary continuity of low-cost operations requisite for commercial production of aluminum by such methods. One of the many problems presented involves the handling and disposition of effluent gas from the electrolytic reduction cell. Such problems are particularly acute when alkaline earth metal halides or alkali metal halides or mixtures thereof containing the aluminum chloride are used as the electrolyte, since the effluent gas will there be made up principally of chlorine, which is highly reactive, poisonous and corrosive, with minor amounts of such components as nitrogen and traces of $CO_2$ together with melt values such as sodium aluminum chloride, aluminum chloride, and combinations of aluminum chloride with the alkali metal and/or alkaline earth metal halides in the form of condensable gas. The presence of such melt constituents in the effluent gas, apart from constituting undesired and uneconomic losses of melt values and being of highly corrosive character, has effectively precluded the direct reuse of the chlorine values because of the detrimental presence of such impurities and because of attendant handling problems created thereby, such as clogging of the conduits through which the effluent gas is conducted, for example, by condensation therein of alkali and/or alkaline earth metal halides or some of the other aforementioned compounds. Still other problems encountered with the use of such effluent gases include the difficulty of condensing the same for use in liquid form in storage or chemical process use.

In accordance with the principles of this invention, an appreciable number of the aforementioned difficulties and problems related to the handling and disposition of the effluent gas formed in production of aluminum by electrolysis of aluminum chloride can be substantially eliminated or avoided with attendant and compounded economic advantage by the herein-described recovery and recycle process, which broadly involves the selective condensation, and permitted separation and return of, material from the halide melt or electrolyte, such as the aforementioned alkali metal and/or alkaline earth metal halide values, and the aluminum chloride values in the effluent gas to the electrolyte, with a consequent production of chlorine gas of relatively high purity and effectively free of condensable impurities therein. In accordance with narrower aspects of the invention, a substantial portion of the aluminum chloride values may be returned to the electrolyte along with the metal halide values, as for example, either dissolved in the halides or combined therewith, as in compound form. The selective condensation of the impurities may be cascaded, i.e., those components of the effluent gas which will condense at a predetermined high temperature level, preferably of from about 100° to about 250°C, being first removed from the effluent gas, and next aluminum chloride values being removed by condensation thereof, either as a liquid or as a solid by direct gas-to-solid desublimation, at a second predetermined and lower temperature level, generally not higher than about 180°C.

In accordance with a preferred mode of operation, the higher boiling components, such as the various alkali and/or alkaline earth metal halides, in combination with aluminum chloride values, are condensed as a liquid, for example, in droplet form, and are removed in a demister in which these components are coalesced in droplet form on a mat, such as one made of quartz, glass, cloth bags or the like, for example, along with small amounts of aluminum chloride. The condensate mentioned in the preceding sentence as containing aluminum chloride values is referred to herein as a mixture, although the aluminum chloride values therein may be present combined chemically with other condensed halides. Further, in accord with this preferred embodiment, the effluent gas, which still contains in gaseous form the aluminum chloride values not removed by the demister, is then passed on to a suitable condenser for condensation under elevated pressure as a liquid, or for direct desublimation to solid crystalline form, and separated for recovery and permitted reintroduction into the electrolytic melt. The residual effluent gas, now constituted of relatively pure chlorine substantially free of condensable impurities, may be further purified by removal of finer-sized solid contaminants, if desired, by passage through permeable filter media, preferably in a filter of the dry or fabric type, prior to its recovery and reuse as substantially pure chlorine. Such recovered chlorine may be directly used, as by introduction into a chlorinator for the production of aluminum chloride, or condensed as a liquid for ready storage and handling prior to ultimate reutilization thereof.

The object of this invention is the provision of an improved and economic recycle system for the recovery and reuse of effluent gas values emitted in the production of aluminum by electrolysis of aluminum chloride.

A further object of this invention is the provision of an effluent gas handling and value recovery system for economically effecting the quantity commercial production of aluminum through electrolysis of aluminum chloride.

Other objects and advantages of the invention will become apparent from the following portion of this specification and from the appended drawing, which illustrates, in accordance with the mandate of the patent statutes, and in schematic form, presently preferred embodiments of apparatus components utilizable in the practice of the invention.

Referring to the drawing, which schematically illustrates the sequence of operations, and in the practice of the improved recycle and recovery process, aluminum is produced in cell 14 by electrolysis of aluminum chloride dissolved in molten alkali or alkaline earth metal chlorides or mixtures thereof, the temperature within the cell 14 normally being in the neighborhood of 700°C. In operation of such a cell, aluminum is removed in molten form as indicated by the arrow 10, and a gaseous effluent, comprising principally chlorine, together with a small amount of nitrogen and containing alkali metal chloride and/or alkaline earth metal chloride from the electrolyte and aluminum chloride, is evolved therefrom as indicated by the arrow 12. Such a gaseous effluent may be exemplarily constituted of about 91.5 percent chlorine, 1.8 percent nitrogen, 4.8 percent alkali and/or alkaline earth metal chlorides, 1.9 percent aluminum chloride and traces of oxygen, and with the alkali and/or alkaline earth metal chlorides being in the form of a gas or in such finely divided form as to constitute a fume.

After evolvement and removal from the cell 14, the effluent gas as above constituted, and at a temperature of approximately 700°C, is cooled, preferably by passage through a heat exchanger 16, to reduce its temperature to a first predetermined value range that is sufficiently low as to effect selective condensation of all of the composite alkali and/or alkaline earth metal-aluminum chloride values without appreciable condensation or desublimation of the aluminum chloride values contained therein. The effluent gas may be reduced by the heat exchanger to a temperature range of from about 150° to about 200°C, thereby effectively condensing such values into small liquid droplets or a mist. Such cooled gaseous effluent is then conducted via line 18 to a coalescing zone such as that illustrated by the demister 20, wherein the now condensed liquid droplets of alkali and/or alkaline earth metal chloride-aluminum chloride combinations are coalesced and separated from the effluent gas. The coalesced liquids, including any aluminum chloride values dissolved therein, and, for example, amounting, in total, to about 0.01 to 0.2 pound (lb.) per standard cubic foot (scf) of effluent gas under standard conditions of 1 atmosphere and 25°C, are then directly returned through the line 22 to the electrolytic cell 14, to thus continually replace the melt constituents being lost therefrom.

The now depleted effluent gas, which still contains in the neighborhood of 0.004 lb/scf effluent gas of aluminum chloride values therein in gaseous form, is then passed via line 24 to a condensation zone or condensing device 26, which may be, for example, a shell-and-tube heat exchanger or a fluidized bed of aluminum chloride operated at a second and lower predetermined temperature range that is often less than about 100°C, to desublime the remaining aluminum chloride values thereof and effect a preliminary separation and transfer thereof via lines 28 to an appropriate collecting device, such as 30, in crystalline form. Such collected aluminum chloride values may then be reintroduced via line 31 into the same or another electrolytic cell for electrolytic decomposition thereof. The now further depleted and relatively pure gaseous effluent is then conducted via line 32 to one or more bag filter units or assemblies 34, by which any remaining or entrained solid impurities, and particularly those of small size, are removed. The solids collected by bag filter unit 34 will essentially comprise aluminum chloride and, if of sufficient purity, may be returned via line 35 to the collector 30 for eventual reintroduction, if desired, into an electrolytic cell 14.

The residual gaseous effluent from the filter 34, now in the form of relatively pure chlorine gas and some nitrogen, may then be conducted via line 36 to a locus of utilization thereof. Such chlorine gas, possibly along with other chlorine values, may be introduced into an aluminum chloride preparation zone 38 in which it may be reacted with alumina-bearing material in the presence of a reducing agent, for example, carbon. At least some of the chlorine values and carbon in such reaction may be employed in combined form, for example, as carbon tetrachloride or carbonyl chloride. Alternatively, such chlorine may be conducted via line 38a to a condenser 39 and the resultant liquid chlorine transferred via line 38b to storage as at 40. As indicated at 42, the aluminum chloride produced in zone 38 may be utilized in the same, or in another electrolytic cell 14.

While the invention has been described in terms of preferred embodiments, the claims appended hereto are intended to encompass all embodiments which fall within the spirit of the invention.

Having thus described our invention and certain embodiments thereof, we claim:

1. In a process for electrolysis of aluminum chloride dissolved in a molten metal halide electrolyte containing at least one halide from the group consisting of alkali metal halides and alkaline earth metal halides to produce aluminum at above 660°C, wherein effluent gas containing gaseous aluminum chloride and at least one gaseous halide of the said electrolyte is evolved, the steps comprising selectively condensing and separating from said effluent gas a mixture of aluminum chloride and at least one substance selected from the group consisting of alkali metal halides and alkaline earth metal halides, and subsequently condensing remaining aluminum chloride from the residual gaseous effluent.

2. The process of claim 1, wherein the said condensed mixture is returned to the said electrolyte.

3. The process of claim 1, wherein the said subsequently condenssed aluminum chloride is returned to said electrolyte.

4. The process of claim 1, wherein both the said condensed mixture and the subsequently condensed aluminum chloride are returned to the said electrolyte.

5. The process of claim 1, wherein chlorine is recovered from the residual gaseous effluent subsequent to said subsequent condensing of aluminum chloride.

6. The process of claim 1, wherein the selective condensing is effected at a temperature of about 100°–250°C, and the subsequent condensing is effected at a temperature lower than the temperature employed in said selective condensing.

7. The process of claim 1, wherein the alkali metal halide is alkali metal chloride, and the alkaline earth metal halide is alkaline earth metal chloride.

8. The process of claim 1, wherein the said step of subsequently condensing remaining aluminum chloride in the residual gaseous effluent is effected at a lower temperature than the said selective condensing step.

9. In a process for electrolysis of aluminum chloride in a metal halide electrolyte containing at least one halide from the group consisting of alkali metal chloride and alkaline earth metal chloride to produce aluminum at above 660°C wherein effluent gas containing aluminum chloride is evolved, the steps comprising cooling a stream of the effluent gas generated by such electrolysis of aluminum chloride to a temperature of 100° to 250°C, thereby condensing from said effluent gas aluminum chloride and at least one substance selected from the group consisting of alkali metal chloride and alkaline earth metal chloride, separating the resulting condensate from the said gas stream, subsequently cooling the remaining gas stream to a temperature lower than the temperature employed in said first cooling step to condense remaining gaseous aluminum chloride therein, and thereafter filtering said gas stream.

10. In a process for electrolysis of aluminum chloride dissolved in a molten metal halide electrolyte containing at least one halide from the group consisting of alkali metal halides and alkaline earth metal halides to produce aluminum at above 660°C, wherein effluent gas containing gaseous aluminum chloride and at least one gaseous halide of the said electrolyte is evolved, the steps comprising selectively condensing and separating from said effluent gas a mixture of aluminum chloride and at least one substance selected from the group consisting of alkali metal halides and alkaline earth metal halides, and subsequently desubliming remaining aluminum chloride from the residual gaseous effluent.

11. In a process for electrolysis of aluminum chloride dissolved in a molten metal halide electrolyte containing at least one halide from the group consisting of alkali metal halides and alkaline earth metal halides to produce aluminum at above 660°C, wherein effluent gas containing gaseous aluminum chloride and at least one gaseous halide of the said electrolyte is evolved, the steps comprising:
a. selectively first condensing and separating from said effluent gas at a first predetermined temperature a mixture of aluminum chloride and at least one substance selected from the group consisting of alkali metal halides and alkaline earth metal halides;
b. subsequently condensing remaining aluminum chloride from the residual gaseous effluent at a second predetermined temperature; and
c. recovering chlorine from the residual gaseous effluent subsequent to said two condensing steps;
whereby aluminum chloride, alkali metal halide, alkaline earth metal halide, and chlorine values may be recovered from said effluent for subsequent use.

* * * * *